Patented Feb. 20, 1923.

1,446,216

UNITED STATES PATENT OFFICE.

ALFRED E. SHERNDAL, OF NEW YORK, N. Y., ASSIGNOR TO HERMAN A. METZ, OF NEW YORK, N. Y.

DIAMINO-DIOXYARSENOBENZENE-SILVER OXIDE COMPOUND AND PROCESS OF MAKING SAME.

No Drawing.      Application filed April 23, 1921. Serial No. 463,955.

*To all whom it may concern:*

Be it known that I, ALFRED E. SHERNDAL, a citizen of the United States, residing at New York, in the county of New York and State of New York, have invented certain new and useful Improvements in Diamino-Dioxyarsenobenzene - Silver Oxide Compounds and Processes of Making the Same, of which the following is a specification.

My invention relates to soluble neutral or alkaline salts of 3, 3′, diamino 4, 4′, dioxyarsenobenzene combined with silver oxide, and to the process of preparing such salts.

An object of my invention is to prepare derivatives from the silver compounds of diamino-dioxyarsenobenzene which are pure, that is, free from toxic constituents and particularly free from toxic or harmful inorganic salts and therefore suitable for therapeutic use in the treatment of spirochætal or protozoal diseases.

I have made the surprising discovery that when freshly prepared silver oxide is intimately mixed by agitation with an alkaline solution of arsphenamin or with a solution of the disodium salt of diamino-dioxyarsenobenzene, the silver oxide dissolves and enters into combination with the arsenic compound forming a complex substance containing arsenic and silver in chemical combination without perceptible oxidation or decomposition of the diamino-dioxyarsenobenzene. This reaction is unexpected and extraordinary. Diamino - dioxyarsenobenzene is very easily susceptible to oxidation giving rise to substances of high toxicity, and silver oxide is a very strong oxidizing agent. Consequently it would be expected that on bringing silver oxide and diamino-dioxyarsenobenzene together, oxidation of the diamino-dioxyarsenobenzene and reduction of the silver oxide would take place. Such oxidation and reduction however does not occur.

The following example illustrates a method of carrying out my process, it being understood that my invention is not limited to the proportions of reagents and the specific procedure described.

Dissolve 6 grams of arsphenamine in 26 cc. of twice normal sodium hydroxid. This quantity of twice normal sodium hydroxid solution contains sodium hydroxid slightly in excess of the amount theoretically necessary to form the disodium salt with 6 grams of diamino-dioxyarsenobenzene dehydrochloride. Alternatively. an aqueous solution of the disodium salt of dioxydiaminoarsenobenzene, containing an equivalent amount, may be used. To the resulting clear, pale yellow solution add gradually and with vigorous stirring a freshly prepared paste of silver oxide. The silver oxide dissolves and the solution becomes dark brown in color. After all of the silver oxide has been added the stirring is continued for about fifteen minutes and the solution is then filtered, the filtrate running directly into about 1000 cc. of 98% alcohol. Instead of alcohol, ether, or mixture of alcohol and ether may be employed. The sodium salt of the silver compound of diamino-dioxyarsenobenzene separates in the form of a brown flaky or flocculent precipitate which is collected on a filter, washed with alcohol and ether and dried in vacuum.

The entire process should be carried out in an atmosphere of inert or non-oxidizing gas such as nitrogen, to avoid the possibility of deterioration of the product through the action of the oxygen of the air.

Silver oxide of suitable quality and in quantity sufficient for the above example may be prepared as follows: Dissolve 1.5 grams of silver nitrate in 60 cc. of water and slowly add sodium hydroxid solution until the solution gives a slightly alkaline indication with litmus paper. Collect the resulting precipitated silver oxide on a filter and wash with sufficient distilled water to remove adhering and occluded sodium nitrate.

The new product prepared according to the above example contains about 13% of silver and 24% of arsenic. By varying the amount of silver oxide added to the alkaline solution of diamino - dioxyarsenobenzene, compounds containing from one atom to two atoms of silver in each molecule of the product may be obtained.

The product is a brown amorphous powder, readily soluble in water with alkaline reaction. It is free from harmful or toxic inorganic salts such as sodium nitrate and is very soluble in water or in physiological salt solution forming directly a solution suitable for intravenous injection.

I claim:

1. The process of making silver compounds of diamino-dioxyarsenobenzene substantially free from toxic inorganic salts, which comprises combining silver oxide free from toxic inorganic salts with diamino-dioxyarsenobenzene.

2. The process of making silver compounds of diamino-dioxyarsenobenzene substantially free of toxic inorganic salts, which comprises dissolving freshly prepared silver oxide which is substantially free from toxic inorganic salts in an alkaline solution of diamino-dioxyarsenobenzene.

3. Process of making silver compounds of diamino-dioxyarsenobenzene, which comprises dissolving silver oxide in a solution of diamino-dioxyarsenobenzene, separating the resulting complex compound from the reaction mixture by precipitation and washing the precipitate, the entire process being carried out in an atmosphere of inert gas.

4. The process of manufacturing the sodium salts of silver compounds of diamino-dioxyarsenobenzene, which consists in intimately mixing freshly prepared silver oxide with an alkaline solution of the disodium salt of diamino-dioxyarsenobenzene, agitating said mixture until the silver oxide is dissolved and a clear dark brown solution is formed, pouring said solution into alcohol, separating the resulting precipitate and drying the same, the entire process being carried out in an atmosphere of non-oxidizing gas.

5. As new products, silver compounds made by the direct combination of silver oxide with diamino-dioxyarsenobenzene, such products being free from toxic inorganic salts.

6. Silver compounds of diamino-dioxyarsenobenzene containing from one to two atoms of silver in each molecule of the compound, said compounds being brown powders substantially free from toxic inorganic constituents.

7. The process of making silver compounds of diamino-dioxyarsenobenzene, which comprises combining silver with diamino-dioxyarsenobenzene in the substantial absence of toxic inorganic salt forming materials.

In testimony whereof, I affix my signature.

ALFRED E. SHERNDAL.